(12) United States Patent
Ramadhane et al.

(10) Patent No.: US 11,856,147 B2
(45) Date of Patent: Dec. 26, 2023

(54) METHOD TO PROTECT PRIVATE AUDIO COMMUNICATIONS

(71) Applicant: International Business Machines Corporation, Armonk, NY (US)

(72) Inventors: Mohamed Zouhaier Ramadhane, Azcapotzalco (MX); Cesar Augusto Rodriguez Bravo, Alajuela (CR); Daniela Ofelia Rojas Barrientos, Naucalpan de Juarez (MX); Carolina Garcia Delgado, Zapopan (MX)

(73) Assignee: International Business Machines Corporation, Armonk, NY (US)

( * ) Notice: Subject to any disclaimer, the term of this patent is extended or adjusted under 35 U.S.C. 154(b) by 125 days.

(21) Appl. No.: 17/567,929

(22) Filed: Jan. 4, 2022

(65) Prior Publication Data

US 2023/0216964 A1 Jul. 6, 2023

(51) Int. Cl.
*H04M 3/56* (2006.01)
*G06F 21/84* (2013.01)
(Continued)

(52) U.S. Cl.
CPC ............ *H04M 3/568* (2013.01); *G06F 21/84* (2013.01); *G10L 19/018* (2013.01); *H04R 3/005* (2013.01)

(58) Field of Classification Search
CPC ........ H04M 3/568; G06F 21/84; H04R 3/005; G10L 19/018
See application file for complete search history.

(56) References Cited

U.S. PATENT DOCUMENTS 3,004,104 A 10/1961 Hembrooke
5,901,232 A 5/1999 Gibbs
(Continued)

FOREIGN PATENT DOCUMENTS

EP 0742679 A2 11/1996
WO 2006118047 A1 11/2006
(Continued)

OTHER PUBLICATIONS

"54 Basic Video and Web Conferencing Statistics: 2020/2021 Analysis of Data & Market Share", FinancesOnline, downloaded from the Internet on Oct. 4, 2021, 20 pages, <https://financesonline.com/video-web-conferencing-statistics/.
(Continued)

*Primary Examiner* — Cheikh T Ndiaye
(74) *Attorney, Agent, or Firm* — Edward P. Li

(57) ABSTRACT

A computer-implemented method for detecting and concealing confidential communications is disclosed. The computer-implemented method includes determining an audio output source used by a participant of an audio conference is unidentifiable. The computer-implemented method further includes responsive to determining that the audio output source used by the participant of the audio conference is unidentifiable, transmitting a high frequency signal via audio conference software used by the participant to conduct the audio conference. The computer-implemented method further includes responsive to detecting the high frequency signal via a microphone of a user device used by the participant to listen to the audio conference, determining that the participant is using a speaker to listen to the audio conference.

14 Claims, 5 Drawing Sheets

(51) Int. Cl.
    *H04R 3/00*    (2006.01)
    *G10L 19/018*    (2013.01)

(56) References Cited

U.S. PATENT DOCUMENTS

| | | | |
|---|---|---|---|
| 6,593,956 | B1 | 7/2003 | Potts |
| 7,394,907 | B2 | 7/2008 | Tashev |
| 8,983,089 | B1 | 3/2015 | Chu |
| 9,015,051 | B2 | 4/2015 | Pulkki |
| 9,025,415 | B2 | 5/2015 | Derkx |
| 9,560,446 | B1 | 1/2017 | Chang |
| 9,693,009 | B2 | 6/2017 | Farrell |
| 11,621,863 | B1* | 4/2023 | VanBlon ............ H04L 12/1831 709/204 |
| 2002/0097885 | A1 | 7/2002 | Birchfield |
| 2011/0044467 | A1 | 2/2011 | Pompei |
| 2014/0286497 | A1 | 9/2014 | Thyssen |
| 2016/0044429 | A1 | 2/2016 | Moffat |
| 2016/0100265 | A1 | 4/2016 | Maggiore |
| 2016/0336022 | A1 | 11/2016 | Florencio |
| 2019/0294407 | A1* | 9/2019 | Beck ....................... G10L 25/78 |
| 2020/0065514 | A1* | 2/2020 | Keen ..................... G10L 19/018 |

FOREIGN PATENT DOCUMENTS

| | | | |
|---|---|---|---|
| WO | 2017137921 | A1 | 8/2017 |
| WO | WO-2023037514 | A1 * | 3/2023 |

OTHER PUBLICATIONS

"Google Tone—Chrome Web Store", downloaded from the Internet on Oct. 4, 2021, 5 pages, <https://chrome.google.com/webstore/detail/google-tone/nnckehldicaciogcbchegobnafnjkcne?hl=en>.

"How to Live Stream Cisco Webex Video Conferences", IBM Watson Media, Streaming Video Blog Product Updates, downloaded from the Internet on Oct. 4, 2021, 10 pages, <https://blog.video.ibm.com/streaming-product-updates/how-to-live-stream-cisco-webex-video-conferences/>.

Mell et al., "The NIST Definition of Cloud Computing", Recommendations of the National Institute of Standards and Technology, NIST Special Publication 800-145, Sep. 2011, 7 pages.

"Method and system for event spoiling prevention of confidential meeting", An IP.com Prior Art Database Technical Disclosure, Authors et al.: Disclosed Anonymously, IP.com No. IPCOM000263891D, IP.com Electronic Publication Date: Oct. 16, 2020, 3 pages.

"Video Conferencing Security Issues and Opportunities", BLOG, Unify Square, A Unisys Company, downloaded from the Internet on Jul. 22, 2021, <https://www.unifysquare.com/blog/video-conferencing-security-issues-and-opportunities/>, 17 pages.

Roy et al., "BackDoor: Making Microphones Hear Inaudible Sounds", MobiSys '17, Jun. 19-23, 2017, Niagara Falls, NY, USA, DOI: http://dx.doi.org/10.1145/3081333.3081366, 13 pages.

* cited by examiner

METHOD TO PROTECT PRIVATE AUDIO COMMUNICATIONS

BACKGROUND

The present invention relates generally to the field of detecting and concealing confidential communications, and more particularly to detecting and concealing confidential communications transmitted during a teleconference.

Online conferences, such as a teleconference or video conference, allow users to meet and discuss virtually. For the audio aspect of a teleconference or video conference, the audio can be played through different output devices, such as primary speakers of a user device, headphones, or secondary speakers. Many online conferences, either work related or personal, can be labeled as confidential or sensitive. The particular output devices selected to listen to the teleconference may depend on whether the information discussed during the teleconference is confidential.

SUMMARY

According to one embodiment of the present invention, a computer-implemented method for detecting and concealing confidential communications is disclosed. The computer-implemented method includes determining an audio output source used by a participant of an audio conference is unidentifiable. The computer-implemented method further includes responsive to determining that the audio output source used by the participant of the audio conference is unidentifiable, transmitting a high frequency signal via audio conference software used by the participant to conduct the audio conference. The computer-implemented method further includes responsive to detecting the high frequency signal via a microphone of a user device used by the participant to listen to the audio conference, determining that the participant is using a speaker to listen to the audio conference.

According to another embodiment of the present invention, a computer program product for detecting and concealing confidential communications is disclosed. The computer program product includes one or more computer readable storage media and program instructions stored on the one or more computer readable storage media. The program instructions include instructions to determine an audio output source used by a participant of an audio conference is unidentifiable. The program instructions further include instructions to responsive to determining that the audio output source used by the participant of the audio conference is unidentifiable, transmit a high frequency signal via audio conference software used by the participant to conduct the audio conference. The program instructions further include instructions to responsive to detecting the high frequency signal via a microphone of a user device used by the participant to listen to the audio conference, determine that the participant is using a speaker to listen to the audio conference.

According to another embodiment of the present invention, a computer system for detecting and concealing confidential communications is disclosed. The computer system includes one or more computer processors, one or more computer readable storage media, and computer program instructions, the computer program instructions being stored on the one or more computer readable storage media for execution by the one or more computer processors. The program instructions include instructions to determine an audio output source used by a participant of an audio conference is unidentifiable. The program instructions further include instructions to responsive to determining that the audio output source used by the participant of the audio conference is unidentifiable, transmit a high frequency signal via audio conference software used by the participant to conduct the audio conference. The program instructions further include instructions to responsive to detecting the high frequency signal via a microphone of a user device used by the participant to listen to the audio conference, determine that the participant is using a speaker to listen to the audio conference.

BRIEF DESCRIPTION OF DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
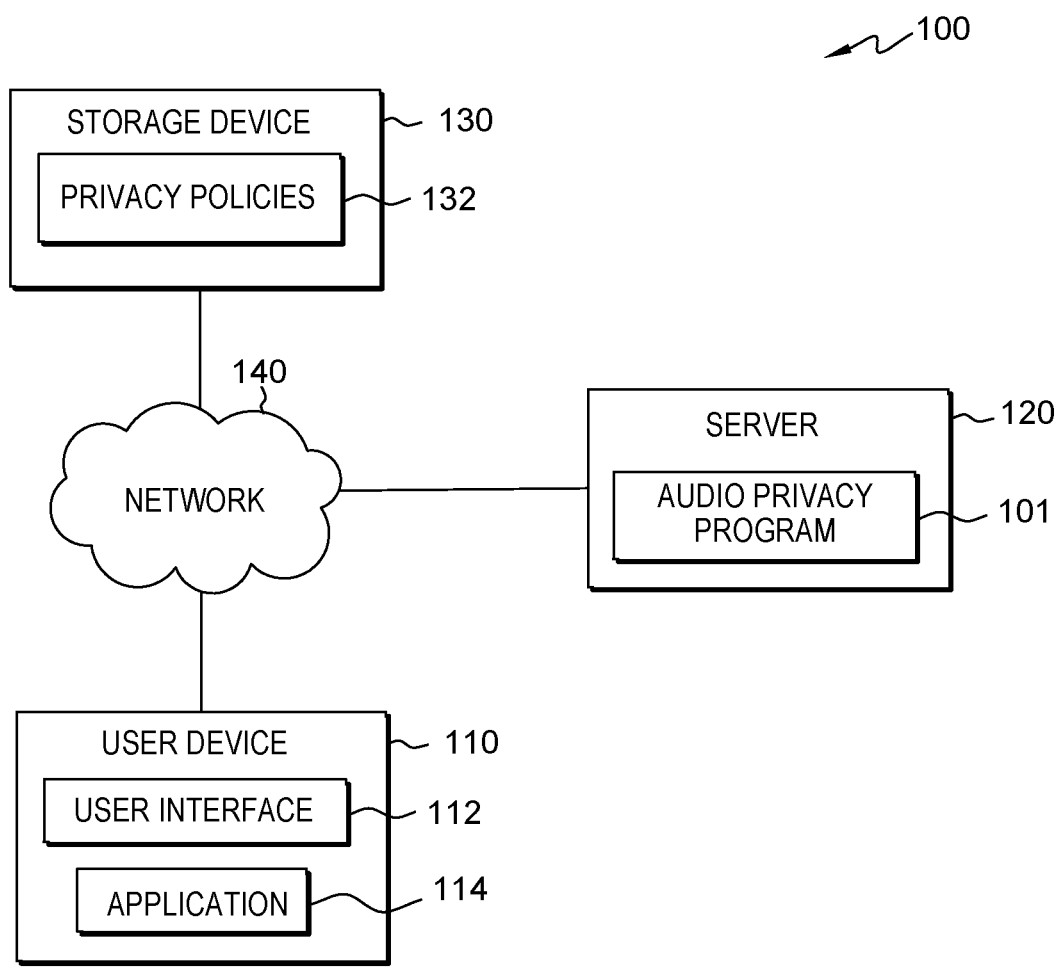
FIG. 1 is a block diagram of a network computing environment for audio privacy program 101, generally designated 100, in accordance with at least one embodiment of the present invention.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

The present invention relates generally to the field of detecting and concealing confidential communications, and more particularly to detecting and concealing confidential communications transmitted during a teleconference.

Audio or video calling is a frequent form of communication used to conduct meetings or conferences. The usage of online conferences, such as a teleconference or video conference, has increased significantly with the rise of employees working remotely. Many conversations held over audio or video calls can be considered confidential or contain sensitive information. For example, businesses with remote employees host meetings virtually and discuss sensitive topics such as budgets, clients, business proposals, acquisitions, and many other confidential or sensitive topics that need to be kept confidential. While discussing confidential or sensitive information via audio or video calling, one or more attendees may have the call on speakerphone or other speaker devices which would allow a non-privileged person nearby to hear the confidential or sensitive information. With the increase of employees working remotely, along with other people nearby either in their home or café, there is an increased threat of confidential information being leaked by unprotected audio. Embodiments of the present invention recognize it is difficult for users on a call or in a meeting to determine the audio settings of the other users on the call or in the meeting. For example, it is difficult for one meeting participant user to determine whether another meeting participant is listening to the meeting audio from the primary speakers of the user device used to conduct the meeting, through headphones, or through secondary speakers.

Embodiments of the present invention provide for emitting inaudible sounds to detect if a confidential meeting is being reproduced from a non-private audio output source, such as a speaker. Embodiments of the present invention further provide for uses one or more microphones to detect if a confidential meeting is being reproduced on a non-private audio output source, such as a built in speaker or external speaker. In an embodiment, the source of the audio output of confidential audio from a user is determined. For example, embodiments of the present invention determine if the audio output is from headphones, the primary speakers of the user device used to conduct the meeting, or a secondary speaker(s). In an embodiment, the source of the audio output is determined by the user device settings or analyzing the location where the audio is detected. In an embodiment, the source of the audio output is determined by emitting a high frequency sound and analyzing the location where the high frequency sound is detected. In an embodiment, a policy is determined based on the type of audio output. In an embodiment, a recommendation or performance of an action passed on the policy selected. For example, a recommendation is made to a user to use headphones or remove that user from the online meeting.

According to an embodiment of the present invention, the array of available microphones one or more user devices currently being used to conduct a teleconference or that have been used to conduct previous teleconferences are leveraged to determine the particular speaker(s) used to listen to the teleconference. It should be noted that even if a meeting participant places the call on mute, this mute function is internal to the conference software only. In this case, selecting the mute button via the conference application will instruct the conference software to prevent sending any microphone input to the conference application server. However, the streaming software still has access to the array of microphones offered by the operating system of the user. In order to be able to detect if a meeting participant is listening to the teleconference externally (e.g., via speakers built into the device used to conduct the teleconference or external speakers), a determination is made whether the user is using speakers. For example, using a microphone of a user device of the first meeting participant, it can be determined whether audio of another meeting participant is detected by the built in microphone of the user device of the first meeting participant.

If audio from other meeting participants is not detected by the microphone of the user device of the first meeting participant, a high frequency sound, ultrasonic sound, or ultra-low frequency sound that cannot be detected by the human ear is emitted via the particular audio output used by the first user to conduct the teleconference. If the microphone of the user device of the first meeting participant detects the high frequency sound, it can be determined that the first user is using speakers to listen to the teleconference. Based on detecting that the user is using speakers, actions are taken to conceal the teleconference audio if the meeting information is confidential or sensitive. For example, a user can be notified to switch their audio input from external speakers to headphones. In another example, the teleconference audio can be blocked from being transmitted via built in speakers of a user device used by a participant of an audio conference.

According to one embodiment of the present invention, a computer-implemented method for managing privacy of audio data during an audio conference is disclosed. The computer-implemented method includes collecting audio data from respective audio output devices associated with participants of an audio conference in response to initiating a confidentiality mode. The computer-implemented method further includes determining whether a particular audio output device used to emit the audio data are identifiable. The computer-implemented method further includes, responsive to determining that the audio output device is unidentifiable, comparing an acoustic fingerprint generated from the audio data to one or more known acoustic fingerprints associated with one or more known audio output devices. The computer-implemented method further includes, responsive to matching the generated acoustic fingerprint to a known audio output device, determining that the audio data is being emitted from the known audio output device. The computer-implemented method further includes, responsive to not matching the generated acoustic fingerprint to a known audio output device, emitting a high frequency audio signal via audio conference software used by the participant to conduct the audio conference. The computer-implemented method further includes collecting additional audio data that includes the high frequency audio signal. The computer-implemented method further includes, in response to detecting the high frequency audio signal via a microphone of a user device of a participant of the audio conference, determining that the participant is using a speaker output device to listen to the audio conference. The computer-implemented method further includes, in response to determining that the participant is using a speaker output device to listen to the audio conference, initiating at least one action from a predetermined set of actions, including reporting a failure, a configuration error, notifying the participant that an external speaker output device is being used, and block the audio data from being emitted from the speaker output device.

The present invention may be a system, a method, and/or a computer program product at any possible technical detail level of integration. The computer program product may include a computer readable storage medium (or media) having computer readable program instructions thereon for causing a processor to carry out aspects of the present.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punch-cards or raised structures in a groove having instructions recorded thereon, and any suit-able combination of the foregoing. A computer readable storage medium, as used herein, is not to be construed as being transitory signals per se, such as radio waves or other freely propagating electro-magnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention will now be described in detail with reference to the Figures. FIG. 1 is a functional block diagram of a network computing environment for audio privacy program 101, generally designated 100, in accordance with at least one embodiment of the present invention. In an embodiment, network computing environment 100 may be provided by cloud computing environment 50, as depicted and described with reference to FIG. 4, in accordance with at least one embodiment of the present invention. FIG. 1 provides an illustration of only one implementation and does not imply any limitations with regard to the environments in which different embodiments may be implemented. Many modifications to the depicted environment may be made by those skilled in the art without departing from the scope of the present invention as recited by the claims.

Network computing environment 100 includes user device 110, server 120, and storage device 130 interconnected over network 140. In an embodiment, there are multiple user device 110 connected over network 140. User device 110 may represent a computing device of a user, such as a laptop computer, a tablet computer, a netbook computer, a personal computer, a desktop computer, a personal digital assistant (PDA), a smart phone, a wearable device (e.g., smart glasses, smart watches, e-textiles, AR headsets, etc.), or any programmable computer systems known in the art. In general, user device 110 can represent any programmable electronic device or combination of programmable electronic devices capable of executing machine readable program instructions and communicating with server 120, storage device 130 and other devices (not depicted) via a network, such as network 140. User device 110 can include internal and external hardware components, as depicted and described in further detail with respect to FIG. 3.

User device 110 further includes user interface 112 and application 114. User interface 112 is a program that provides an interface between a user of an end user device, such as user device 110, and a plurality of applications that reside on the device (e.g., application 114). A user interface, such as user interface 112, refers to the information (such as graphic, text, and sound) that a program presents to a user, and the control sequences the user employs to control the program. A variety of types of user interfaces exist. In one embodiment, user interface 112 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 112 is a script or application programming interface (API). In an embodiment, user interface 112 provides an interface for the online conference, such as a teleconference or video conference.

Application 114 can be representative of one or more applications (e.g., an application suite) that operate on user device 110. In an embodiment, application 114 is representative of one or more applications (e.g., social media applications, web conferencing applications, and email applications) located on user device 110. In various example embodiments, application 114 can be an application that a user of user device 110 utilizes to participate in an online conference, such as a teleconference or video conference. In an embodiment, application 114 can be a client-side application associated with a server-side application running on server 120 (e.g., a client-side application associated with audio privacy program 101). In an embodiment, application 114 can operate to perform processing steps of audio privacy program 101 (i.e., application 114 can be representative of audio privacy program 101 operating on user device 110).

In an embodiment, user device 110 further includes one or more microphones for capturing audio during a teleconference and one or more speakers for producing audio transmitted via the teleconference. As used herein, speakers may include speakers built into a device used to conduct an audio conference, such as user device 110, or external speakers connected either physically (e.g., by USB or audio jack) or wirelessly to a device used to conduct an audio conference, such as user device 110.

Server 120 is configured to provide resources to various computing devices, such as user device 110. In various embodiments, server 120 is a computing device that can be a standalone device, a management server, a web server, an application server, a mobile device, or any other electronic device or computing system capable of receiving, sending, and processing data. In an embodiment, server 120 represents a server computing system utilizing multiple computers as a server system, such as in a cloud computing environment. In an embodiment, server 120 represents a computing system utilizing clustered computers and components (e.g. database server computer, application server computer, web server computer, webmail server computer, media server computer, etc.) that act as a single pool of seamless resources when accessed within network computing environment 100. In general, server 120 represents any programmable electronic device or combination of programmable electronic devices capable of executing machine readable program instructions and communicating with each other, as well as with user device 110, storage device 130, and other computing devices (not shown) within network computing environment 100 via a network, such as network 140.

In an embodiment, server 120 includes audio privacy program 101. In an embodiment, audio privacy program 101 may be configured to access various data sources that may include personal data, content, contextual data, or information that a user does not want to be processed. Personal data includes personally identifying information or sensitive personal information as well as user information, such as location tracking or geolocation information. Personal data further includes user device settings, such as connected headphones, speakers, or speakerphone. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. In an embodiment, audio privacy program 101 enables the authorized and secure processing of personal data. In an embodiment, audio privacy program 101 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. In an embodiment, audio privacy program 101 provides information regarding personal data and the nature (e.g., type, scope, purpose, duration, etc.) of the processing. In an embodiment, audio privacy program 101 provides a user with copies of stored personal data. In an embodiment, audio privacy program 101 allows for the correction or completion of incorrect or incomplete personal data. In an embodiment, audio privacy program 101 allows for the immediate deletion of personal data.

Figure 3:
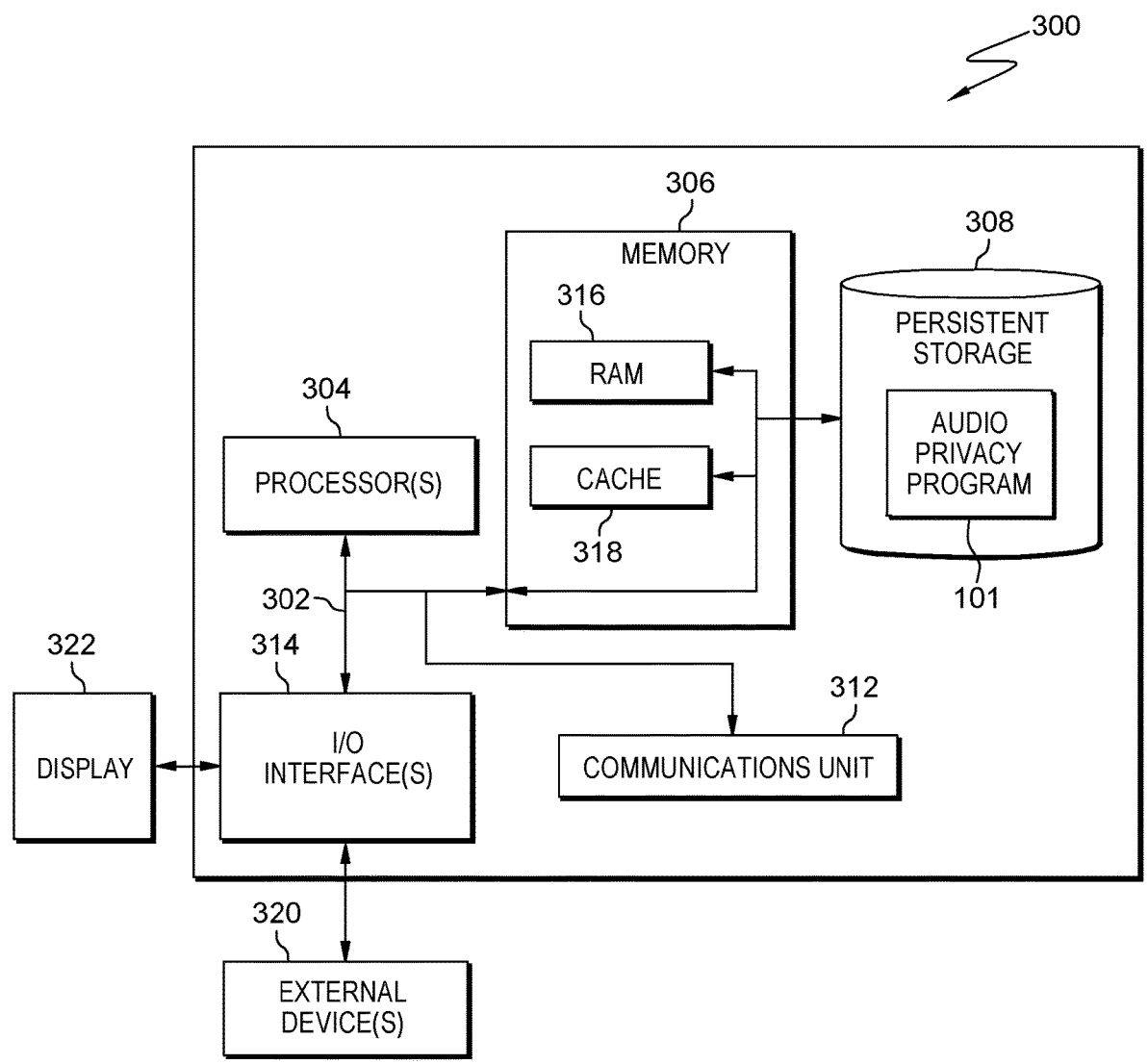
FIG. 3 is a block diagram depicting components of a computer, generally designated 300, suitable for executing an audio privacy program 101 in accordance with at least one embodiment of the present invention.
Figure 4:
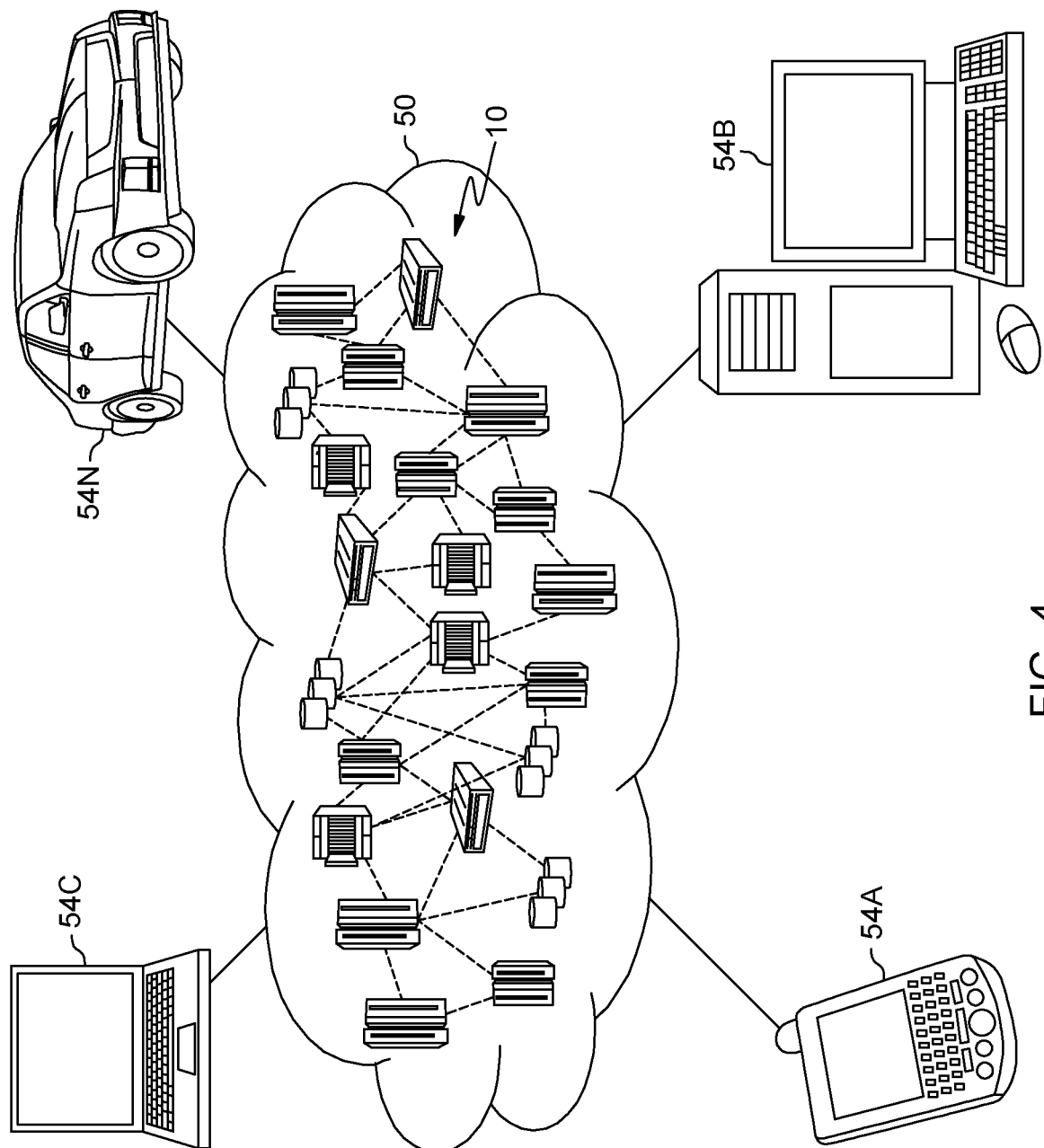
FIG. 4 is a block diagram depicting a cloud computing environment 50 in accordance with at least one embodiment of the present invention.

Server 120 may include components as depicted and described in detail with respect to cloud computing node 10, as described in reference to FIG. 4, in accordance with at least one embodiment of the present invention. Server 120 may include components, as depicted and described in detail with respect to computing device 300 of FIG. 3, in accordance with at east one embodiment of the present invention.

In various embodiments, storage device 130 is a secure data repository for persistently storing one or more audio privacy policies, such as privacy policies 132. Storage device 130 may be implemented using any volatile or non-volatile storage media known in the art for storing data. For example, storage device 130 may be implemented with a tape library, optical library, one or more independent hard disk drives, multiple hard disk drives in a redundant array of independent disks (RAID), solid-state drives (SSD), random-access memory (RAM), and any possible combination thereof. Similarly, storage device 130 may be implemented with any suitable storage architecture known in the art, such as a relational database, an object-oriented database, or one or more tables.

in an embodiment, storage device 130 includes privacy policies 132. In an embodiment, privacy policies 132 includes a dynamic set of rules for recommending or performing a privacy action. In an embodiment, privacy policies 132 includes information describing different decision-making actions audio privacy program 101 should perform depending on the particular audio output detected. For example, privacy policies 132 may include a different set of rules as to recommendations or actions to take based on whether audio is detected from the user device or from a secondary speaker. In another example, privacy policies 132 may include a different set of rules for recommendations or actions based on the confidentiality score of the audio or video call. In an embodiment, the confidentiality score is predetermined or received by the user and indicates the degree of sensitivity or confidentiality of the audio or video call. For example, a policy for a high confidentiality score may automatically remove a user from the audio or video call if it is determined the audio output is a speaker. Whereas a policy for a low confidentiality score may generate a message recommending to the user to utilize headphones if it is determined the audio output is a speaker.

In an embodiment, audio privacy program 101 determines an audio or video call is confidential. In an embodiment, audio privacy program 101 receives user input that the audio or video call is confidential. For example, audio privacy program 101 receives information indicating that the user has turned on Confidentiality Mode (i.e., a selection indicating a meeting includes confidential or sensitive information). In an embodiment, audio privacy program 101 receives user input including the degree of confidentiality of the audio or video call. In an embodiment, the degree of confidentiality is dependent on the topics, matter, or attendees of the audio or video call and is determinative of the degree that the information must be kept confidential. For example, an audio call between two coworkers to discuss a current project may have a lower degree of confidentiality than an audio call with a company's executive board to discuss budget and position cuts.

In an embodiment, audio privacy program 101 collects sound data from the user device settings. For example, audio privacy program 101 collects information indicating microphone B is the audio input source. In an embodiment, audio privacy program 101 collects information on all available microphones from the user device. In an embodiment, audio privacy program 101 collects information on the one or more preferred microphones from the user device. In an embodiment, audio privacy program 101 identifies the audio output used by a user to conduct a teleconference by user audio history. In an embodiment, the user audio history is information about the audio output the user has previously used. For example, if audio privacy program 101 determines the user always uses wireless headphones when in any meeting, audio privacy program 101 can determine the audio output for the current audio or video conference is the users wireless headphones. In an embodiment, audio privacy program 101 identifies the microphone used by a user to conduct a teleconference by user microphone history. In an embodiment, user microphone history is information about the particular microphone the user has previously used. For example, if audio privacy program 101 determines the user microphone history includes information that a user always uses microphone A when in any meeting, audio privacy program 101 can determine the input audio for the current audio or video conference is microphone A.

In an embodiment, audio privacy program 101 identifies that the default audio output is being used based on the audio output settings of the device used to conduct the teleconference. In an embodiment, audio privacy program 101 confirms the default audio output by a device ID or device connection. For example, audio privacy program 101 confirms the default audio output is a wireless device by a known device ID associated with a particular wireless device. In another example, audio privacy program 101 determines the audio output is an external speaker due to the detection of a connector being connected to a computer port.

In an embodiment, audio privacy program 101 identifies the audio output. In an embodiment, audio privacy program 101 leverages an array of available microphones. In an embodiment, audio privacy program 101 accesses settings on one or more user devices to identify the audio output. In embodiments where the user may be on mute, audio privacy program 101 does not capture and transmit audio input to an application server associated with a teleconference application.

In an embodiment, audio privacy program 101 uses passive detection to identify the audio output being used by a user during a teleconference. In an embodiment, audio privacy program 101 analyzes the audio output of a particular audio output device to calculate a permissive identifier. In an embodiment, the permissive identifier is an acoustic fingerprint. An acoustic fingerprint is a condensed digital summary, deterministically generated from an audio signal, that can be used to identify an audio sample or quickly locate similar items in an audio database. In an embodiment, audio privacy program 101 compares the audio output or acoustic fingerprint to identify an output source. In an embodiment, audio privacy program 101 determines if the collected audio contains the acoustic fingerprint calculated from the audio output. For example, if audio privacy program 101 determines that the collected audio contains the acoustic fingerprint calculated from the audio output from a particular speaker, the user is using the particular speaker as the audio output. In an embodiment, audio privacy program 101 utilizes volume filters to avoid false positives. Volume filters will not take into consideration any audio detected by the array of microphones that are below a predetermined decibel level. For example, volume filters can be used when a user is using headphones at a high decibel level.

In an embodiment, audio privacy program 101 detects if the user is using a non-private audio output (e.g., external speakers) by detecting through one or more microphones on user device the audio output of the audio or video conferences. In an embodiment, audio privacy program 101 utilizes a plurality of user devices on a given network to detect if a confidential meeting is being reproduced on a non-private audio output, such as speakers. For example, audio privacy program 101 detects the audio output from a computer speaker and determines that a user is listening to the teleconference conference using a non-private audio output.

In an embodiment, audio privacy program 101 uses active detection to identify the audio output. In an embodiment, audio privacy program 101 uses active detection when the passive detection is unable to identify an audio output. Typically, active detection will be used when there is no audio output from the audio or video conference or there is an abundance of external noise. In these scenarios, audio privacy program 101 is unable to detect audio from the teleconference itself. For example, audio privacy program 101 determines that the user is unmuted, but no audio is detected or the particular person that is speaking is undetectable. In these embodiments, audio privacy program 101 utilizes the same audio output used for the audio or video call to emit a high frequency sound. In an embodiment, the high frequency sound is unique (i.e., containing identifiable data, specific frequency changes, or variable signals, etc.). In these embodiments, audio privacy program 101 emits an inaudible sound to detect if a confidential meeting is being reproduced on non-private audio outputs, such as a speaker. In an embodiment, the high frequency sound comprises one or more of an IDS, ultrasonic sounds, high frequency (HF), or ultra-low frequency (ULF). In an embodiment, audio privacy program 101 utilizes the same array of microphones to detect the emitted audio. In an embodiment, audio privacy program 101 collects the audio from all available microphones in order to determine the acoustic identifying information (ID). An acoustic ID can include an audio fingerprint for the high frequency signal or any kind of audio data encoding. For example, audio privacy program 101 assigns a specific digit to every frequency, then emits a frequency corresponding to a known digit. For example, if the acoustic ID determined is identified as wireless headphones, audio privacy program 101 determines the audio output is wireless headphones. In an embodiment, audio privacy program 101 detects the audio signature and identifies the audio output.

In an embodiment, audio privacy program 101 selects an audio policy based on the determined audio output. For example, if audio privacy program 101 determines the audio output is the built in speakers on the user device, audio privacy program 101 selects an audio policy for the user device built in speakers. In an embodiment, audio privacy program 101 selects an audio policy based on the confidentiality score of the audio or video conference. For example, if audio privacy program 101 determines the confidentiality score of the audio or video conference is high (i.e., above a predetermined threshold), audio privacy program 101 selects an audio policy corresponding to a high confidentiality score. Similarly, if audio privacy program 101 determines the confidentiality score of the audio or video is low (i.e., below a predetermined threshold), audio privacy program 101 selects an audio policy corresponding to a low confidentiality score.

In an embodiment, audio privacy program 101 takes or recommends predetermined actions based on the policy. For example, if the policy includes a rule to display message to connect headphones, audio privacy program 101 displays a message to the user on user device 110 recommending the user connect headphones to user device 110. In another example, if the policy includes a rule that the user must be removed from the audio or video call, audio privacy program 101 removes the user from the audio or video call until the user utilizes a different audio output such that confidentiality of any meeting content is preserved. In an additional example, if the policy includes a rule that the audio output is not to be played through speakers, audio privacy program 101 does not play the audio output from the audio or video call through the speakers.

In an example, audio privacy program 101 receives user input that audio meeting A is confidential. Audio privacy program 101 collects sound data from the one or more user device settings to determine user A on user device A has wireless headphones B and speaker C connected to user device A. Audio privacy program 101 uses passive detection to identify the audio output and analyze the audio output to calculate a permissive identifier. Audio privacy program 101 compares the audio to identify an output type of speaker C based on the acoustic fingerprint. Audio privacy program 101 selects a policy based on audio output speakers and displays a message to user A recommending to switch the audio output from non-private speakers to private headphones.

In a different example, audio privacy program 101 receives user input that audio meeting A is confidential. Audio privacy program 101 collects sound data from the one or more user device settings to determine user A on user device A has wireless headphones B and speaker C connected to user device A. Audio privacy program 101 is unable to detect the audio output from passive detection because no users are speaking in audio meeting A. Audio privacy program 101 uses active detection to identify the audio output. Audio privacy program 101 determines the user is unmuted but is not speaking or making noise. Audio privacy program 101 utilizes the same audio output used for audio meeting A to emit a high frequency sound. Audio privacy program 101 collects the audio from all available microphones in order to determine the acoustic ID of speaker C. Audio privacy program 101 selects a policy based on audio output speakers and displays a message to user A recommending to switch the audio output from non-private speakers to private headphones.

Figure 2:
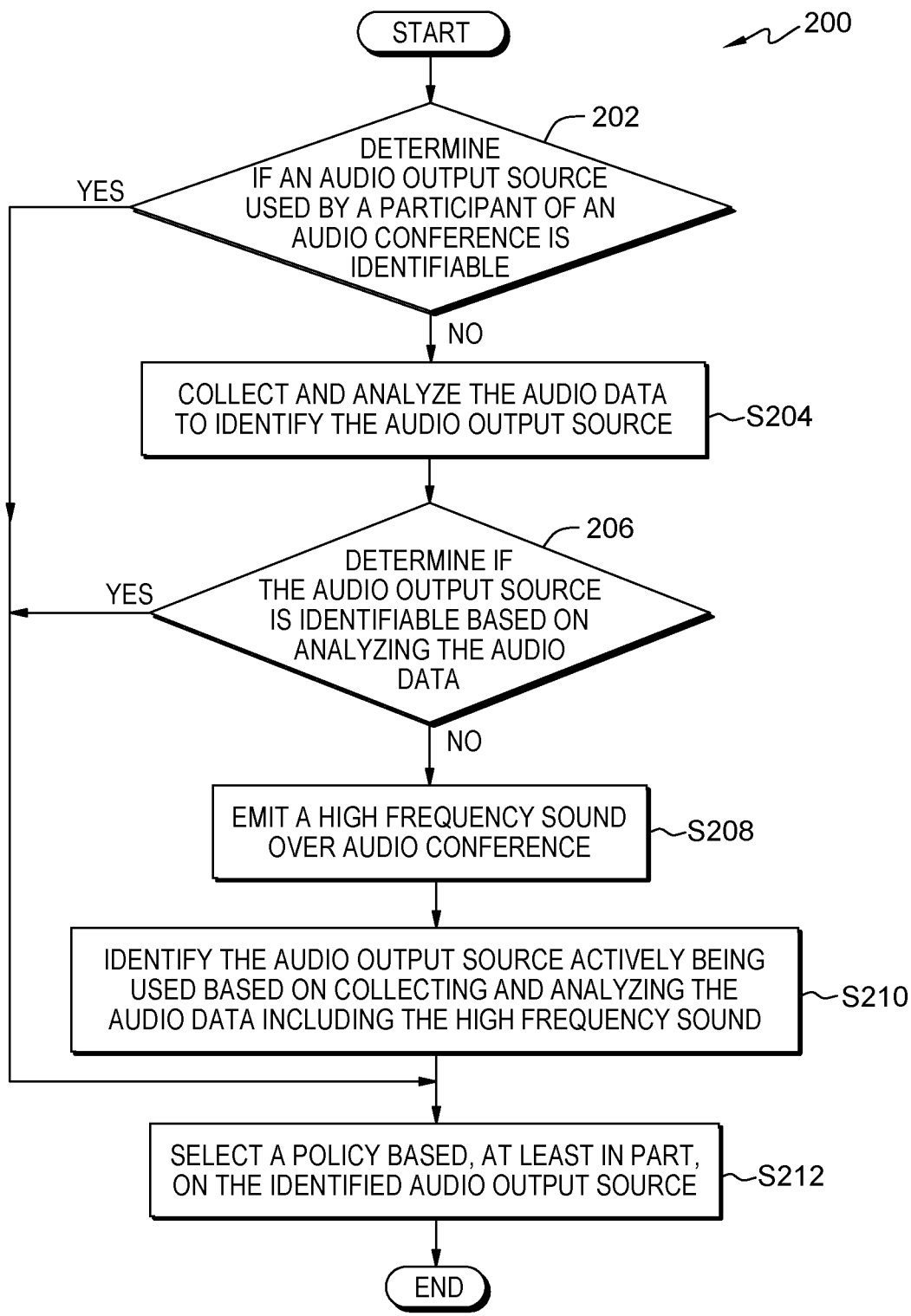
FIG. 2 is a flow chart diagram depicting operational steps for an audio privacy program 101 to protect private communications, generally designated 200, in accordance with at least one embodiment of the present invention.

FIG. 2 is a flow chart diagram depicting operational steps for audio privacy program 101 to protect private communications, generally designated 200, in accordance with at least one embodiment of the present invention. FIG. 2 provides only an illustration of one implementation and does not imply any limitations with regard to the environments in which different embodiments may be implemented. Many modifications to the depicted environment may be made by those skilled in the art without departing from the scope of the invention as recited by the claims.

At decision step S202, audio privacy program 101 determines if an audio output source used by a participant of an audio conference is identifiable. In an embodiment, audio privacy program 101 accesses settings on one or more user devices to identify the audio output source. If the audio output source is identifiable (decision step S202 "YES" branch), audio privacy program 101 proceeds to step S212. If the audio output source is unidentifiable (decision step S202 "NO" branch), audio privacy program 101 proceeds to decision step S204.

At step S204, responsive to determining that the audio output source is unidentifiable, audio privacy program 101 collects and analyzes the audio data to identify the audio output source. In an embodiment, audio privacy program 101 uses passive detection to identify the audio output source. In an embodiment, audio privacy program 101 analyzes audio to identify a permissive identifier or acoustic fingerprint associated with a particular audio output source.

At decision step S206, audio privacy program 101 determines if the audio output source is identifiable based on analyzing the audio data. In an embodiment, audio privacy program 101 determines if the collected audio contains the acoustic fingerprint associated with a particular audio output source. If the audio output source is identifiable (decision step S206 "YES" branch), audio privacy program 101 proceeds to step S212. If the audio output source is unidentifiable (decision step S206 "NO" branch), audio privacy program 101 proceeds to decision step S208.

At step S208, responsive to determining the audio output source is unidentifiable, audio privacy program 101 emits a high frequency sound over audio conference. For example, the high frequency sound is emitted by an audio conference server, in which the high frequency sound is played through any actively enabled audio output sources used by participants of the audio conference to listen to the audio conference.

At step S210, audio privacy program 101 identifies the audio output source actively being used based on collecting and analyzing the audio data including the high frequency sound. In an embodiment, audio privacy program 101 compares the audio including the high frequency sound to identify the particular audio output source that emitted the high frequency sound. In an embodiment, audio privacy program 101 identifies the particular audio output source based on determining that the audio from a particular audio output source includes an acoustic fingerprint that matches the high frequency sound. In an embodiment, audio privacy program 101 identifies that a participant of the audio conference is using a non-private audio output device (speakers) to listen to the audio conference based, at least in part, on detecting the high frequency audio signal via a microphone of a user device of a participant of the audio conference.

At step S212, audio privacy program 101 selects a policy based, at least in part, on the identified audio output source. In an embodiment, audio privacy program 101 further selects an audio policy based on a confidentiality score associated with the audio emitted from the identified audio output source.

FIG. 3 is a block diagram depicting components of a computing device, generally designated 300, suitable for audio privacy program 101 in accordance with at least one embodiment of the invention. Computing device 300 includes one or more processor(s) 304 (including one or more computer processors), communications fabric 302, memory 306 including, RAM 316 and cache 318, persistent storage 308, which further includes audio privacy program 101, communications unit 312, I/O interface(s) 314, display 322, and external device(s) 320. It should be appreciated that FIG. 3 provides only an illustration of one embodiment and does not imply any limitations with regard to the environments in which different embodiments may be implemented. Many modifications to the depicted environment may be made.

As depicted, computing device 300 operates over communications fabric 302, which provides communications between computer processor(s) 304, memory 306, persistent storage 308, communications unit 312, and input/output (I/O) interface(s) 314. Communications fabric 302 can be implemented with any architecture suitable for passing data or control information between processor(s) 304 (e.g., microprocessors, communications processors, and network processors), memory 306, external device(s) 320, and any other hardware components within a system. For example, communications fabric 302 can be implemented with one or more buses.

Memory 306 and persistent storage 308 are computer readable storage media. In the depicted embodiment, memory 306 includes random-access memory (RAM) 316 and cache 318. In general, memory 306 can include any suitable volatile or non-volatile one or more computer readable storage media.

Program instructions for audio privacy program 101 can be stored in persistent storage 308, or more generally, any computer readable storage media, for execution by one or more of the respective computer processor(s) 304 via one or more memories of memory 306. Persistent storage 308 can be a magnetic hard disk drive, a solid-state disk drive, a semiconductor storage device, read-only memory (ROM), electronically erasable programmable read-only memory (EEPROM), flash memory, or any other computer readable storage media that is capable of storing program instructions or digital information.

Media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 312, in these examples, provides for communications with other data processing systems or devices. In these examples, communications unit 312 can include one or more network interface cards. Communications unit 312 may provide communications through the use of either or both physical and wireless communications links. In the context of some embodiments of the present invention, the source of the various input data may be physically remote to computing device 300 such that the input data may be received, and the output similarly transmitted via communications unit 312.

I/O interface(s) 314 allows for input and output of data with other devices that may operate in conjunction with computing device 300. For example, I/O interface(s) 314 may provide a connection to external device(s) 320, which may be as a keyboard, keypad, a touch screen, or other suitable input devices. External device(s) 320 can also include portable computer readable storage media, for example thumb drives, portable optical or magnetic disks, and memory cards. Software and data used to practice embodiments of the present invention can be stored on such portable computer readable storage media and may be loaded onto persistent storage 308 via I/O interface(s) 314. I/O interface(s) 314 also can similarly connect to display 322. Display 322 provides a mechanism to display data to a user and may be, for example, a computer monitor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

FIG. 4 is a block diagram depicting a cloud computing environment 50 in accordance with at least one embodiment of the present invention. Cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
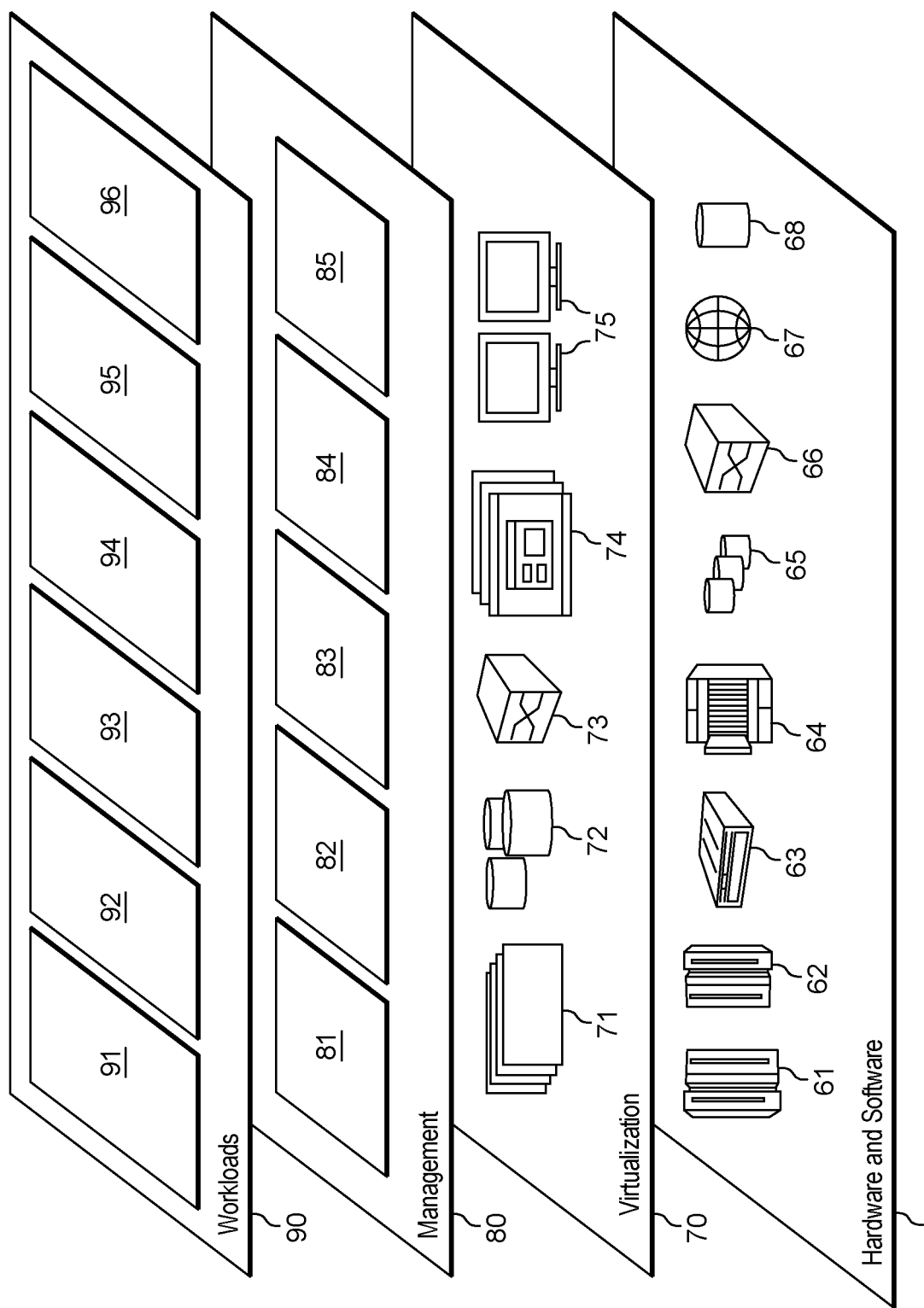
FIG. 5 is block diagram depicting a set of functional abstraction model layers provided by cloud computing environment 50 depicted in FIG. 4 in accordance with at least one embodiment of the present invention.

FIG. 5 is block diagram depicting a set of functional abstraction model layers provided by cloud computing environment 50 depicted in FIG. 4 in accordance with at least one embodiment of the present invention. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; audio delivery 93; data analytics processing 94; transaction processing 95; and audio output source detection 96.

What is claimed is:

1. A computer-implemented method for detecting and concealing confidential communications, the computer-implemented method comprising:
    responsive to a confidentiality mode being initiated for a audio conference, collecting audio data of an audio output source used by a participant of the audio conference;
    generating an acoustic fingerprint from the audio data of the audio output source used by the participant;
    comparing the acoustic fingerprint to known acoustic fingerprints of known audio output sources;
    responsive to the acoustic fingerprint not matching the known acoustic fingerprints, emitting an inaudible sound signal to be played by the audio output source used by the participant;
    responsive to detecting the inaudible sound signal via one or more microphones of one or more user devices used by one or more participants of the audio conference, determining that the participant is using an external speaker to listen to the audio conference; and
    initiating a security measure to conceal confidential communications in the audio conference, the security measure including at least one of notifying the participant that the external speaker cannot be used to listen to the audio conference and blocking the external speaker.

2. The computer-implemented method of claim 1, further comprising:
    identifying the audio output source used by the participant based, at least in part, on matching the acoustic fingerprint to the known acoustic fingerprints.

3. The computer-implemented method of claim 1, wherein initiating the security measure is based, at least in part, on a degree of confidentiality of content discussed during the audio conference.

4. The computer-implemented method of claim 1, wherein determining that the participant is using the speaker to listen to the audio conference is further based, at least in part on:
    matching the acoustic fingerprint generated from the audio data to an acoustic fingerprint associated with the inaudible sound signal.

5. The computer-implemented method of claim 1, further comprising:
    identifying the audio output source used by the participant to listen to the audio conference based, at least in part, on one or more user device settings.

6. A computer program product for detecting and concealing confidential communications, the computer program product comprising one or more computer readable storage media and program instructions stored on the one or more computer readable storage media, the program instructions including instructions to:
    responsive to a confidentiality mode being initiated for a audio conference, collect audio data of an audio output source used by a participant of the audio conference;
    generate an acoustic fingerprint from the audio data of the audio output source used by the participant;
    compare the acoustic fingerprint to known acoustic fingerprints of known audio output sources;
    responsive to the acoustic fingerprint not matching the known acoustic fingerprints, emit an inaudible sound signal to be played by the audio output source used by the participant;
    responsive to detecting the inaudible sound signal via one or more microphones of one or more user devices used by one or more participants of to the audio conference, determine that the participant is using an external speaker to listen to the audio conference;
    initiate a security measure to conceal confidential communications in the audio conference, the security measure including at least one of notifying the participant that the external speaker cannot be used to listen to the audio conference and blocking the external speaker.

7. The computer program product of claim 6, further comprising instructions to:
    identify the audio output source used by the participant based, at least in part, on matching the acoustic fingerprint to the known acoustic fingerprints.

8. The computer program product of claim 6, wherein initiating the security measure is based, at least in part, on a degree of confidentiality of content discussed during the audio conference.

9. The computer program product of claim 6, wherein determining that the participant is using the speaker to listen to the audio conference is further based, at least in part on instructions to:
    match the acoustic fingerprint generated from the audio data to an acoustic fingerprint associated with the inaudible sound signal.

10. The computer program product of claim 6, further comprising instructions to:
    identify the audio output source used by the participant to listen to the audio conference based, at least in part, on one or more user device settings.

11. A computer system for detecting and concealing confidential communications, comprising:
    one or more computer processors;
    one or more computer readable storage media;
    computer program instructions;
    the computer program instructions being stored on the one or more computer readable storage media for execution by the one or more computer processors; and
    the computer program instructions including instructions to:
        responsive to a confidentiality mode being initiated for a audio conference, collect audio data of an audio output source used by a participant of the audio conference;
        generate an acoustic fingerprint from the audio data of the audio output source used by the participant;
        compare the acoustic fingerprint to known acoustic fingerprints of known audio output sources;
        responsive to the acoustic fingerprint not matching the known acoustic fingerprints, emit an inaudible sound signal to be played by the audio output source used by the participant;
        responsive to detecting the inaudible sound signal via one or more microphones of one or more user devices used by one or more participants of the audio conference, determine that the participant is using an external speaker to listen to the audio conference; and initiate a security measure to conceal confidential communications in the audio conference, the security measure including at least one of notifying the participant that the external speaker cannot be used to listen to the audio conference and blocking the external speaker.

12. The computer system of claim 11, further comprising instructions to:
identify the audio output source used by the participant based, at least in part, on matching the acoustic fingerprint to the known acoustic fingerprints.

13. The computer system of claim 8, wherein initiating the security measure is based, at least in part, on a degree of confidentiality of content discussed during the audio conference.

14. The computer system of claim 11, wherein determining that the participant is using the speaker to listen to the audio conference is further based, at least in part on instructions to:
match the acoustic fingerprint generated from the audio data to an acoustic fingerprint associated with the inaudible sound signal.

\* \* \* \* \*